US008972863B2

(12) United States Patent
Wald

(10) Patent No.: US 8,972,863 B2
(45) Date of Patent: Mar. 3, 2015

(54) STANDARD SCHEMA AND USER INTERFACE FOR WEBSITE MAPS

(75) Inventor: Justin Wald, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 863 days.

(21) Appl. No.: 13/118,343

(22) Filed: May 27, 2011

(65) Prior Publication Data

US 2011/0231776 A1   Sep. 22, 2011

Related U.S. Application Data

(63) Continuation of application No. 12/098,397, filed on Apr. 4, 2008, now Pat. No. 7,984,379.

(51) Int. Cl.
G06F 3/14      (2006.01)
G06F 17/30     (2006.01)

(52) U.S. Cl.
CPC .... *G06F 17/30873* (2013.01); *G06F 17/30899* (2013.01)
USPC ........ 715/738; 715/700; 707/104.1; 705/14.4

(58) Field of Classification Search
CPC ..................... G06F 3/14; G06F 3/17
USPC .......... 715/200–277, 700–867; 700/701–866; 709/201–229; 705/14.4, 50–79; 345/30–111; 707/104.1
See application file for complete search history.

(56) References Cited

U.S. PATENT DOCUMENTS

| | | | |
|---|---|---|---|
| 6,826,553 B1 | 11/2004 | DaCosta et al. | |
| 7,290,061 B2 | 10/2007 | Lentini et al. | |
| 7,631,255 B2 | 12/2009 | Weise et al. | |
| 7,984,379 B2 | 7/2011 | Wald | |
| 2002/0152244 A1 | 10/2002 | Dean et al. | |
| 2003/0014440 A1 | 1/2003 | Bussert et al. | |
| 2003/0088639 A1 | 5/2003 | Lentini et al. | |
| 2003/0187744 A1 | 10/2003 | Goodridge, Jr. | |
| 2004/0030719 A1* | 2/2004 | Wei | 707/104.1 |
| 2004/0225958 A1 | 11/2004 | Halpert et al. | |
| 2005/0160065 A1 | 7/2005 | Seeman | |
| 2005/0172262 A1 | 8/2005 | Lalwani | |
| 2006/0036662 A1 | 2/2006 | Cornell | |

(Continued)

FOREIGN PATENT DOCUMENTS

| | | |
|---|---|---|
| CN | 101093481 A | 12/2007 |
| JP | 2000305835 | 11/2000 |

(Continued)

OTHER PUBLICATIONS

"Non-Final Office Action", U.S. Appl. No. 12/098,397, (Jan. 5, 2011),7 pages.

(Continued)

*Primary Examiner* — Ruay Ho
(74) *Attorney, Agent, or Firm* — John Jardine; Kate Drakos; Micky Minhas

(57) ABSTRACT

Various embodiments provide a standardized schema that can be used by site developers to define a site map and its associated hierarchy. In at least some embodiments, a corresponding user interface can be created within an application such as, for example, a Web browser, to allow the user to specify locations at which they wish to see the site map.

20 Claims, 6 Drawing Sheets

(56) References Cited

U.S. PATENT DOCUMENTS

| | | | |
|---|---|---|---|
| 2006/0101424 A1 | 5/2006 | Griffith et al. | |
| 2006/0129921 A1 | 6/2006 | Relyea et al. | |
| 2009/0254834 A1 | 10/2009 | Wald | |
| 2009/0276835 A1 | 11/2009 | Jackson et al. | |
| 2011/0047014 A1* | 2/2011 | De Angelo | 705/14.4 |

FOREIGN PATENT DOCUMENTS

| | | |
|---|---|---|
| JP | 2002288224 | 10/2002 |
| KR | 1020060046337 | 5/2006 |
| WO | 02/42863 A2 | 5/2002 |

OTHER PUBLICATIONS

"Notice of Allowance", U.S. Appl. No. 12/098,397, (Apr. 11, 2011), 4 pages.

"PCT Search Report and Written Opinion", Application No. PCT/US2009/036007, (Jan. 21, 2011), 9 pages.

Ceri, Stefano et al., "Web Modeling Language (WebML): a Modeling Language for Designing Web Sites", *Ninth International World Wide Web Conference*, (May 15, 2000), 22 pages.

Dolog, Peter et al., "Using UML and XMI for Generating Adaptive Navigation Sequences in Web-Based Systems", *International conference on the Unified Modeling Language*, (Oct. 20, 2003), pp. 1-15.

Gristwood, David "Understanding and Extending the Site Navigation System in Asp.Net 2.0", Retrieved from: <http://msdn.microsoft.com/en-us/library/aa479338.aspx> on Nov. 24, 2009, (Aug. 2005), 15 pages.

Sureau, Denis "Simple Map-Site Map Generator", 1-4.

Wookey, et al., "Semantic Hierarchical Abstraction of Web Site Structures for Web Searchers", *Journal of Research and Practice in Information Technology*, vol. 36, No. 1 Feb. 2004, Australian Computer Society Inc.,, (2004), 23-34.

"Notice of Allowance Issued in Chinese Patent Application No. 200980112892.1", Mailed Date: Nov. 14, 2013, Filed Date: Mar. 4, 2009, 4 Pages.

"First Office Action and Search Report Issued in Chinese Patent Application No. 200980112892.1", Mailed Date: Dec. 3, 2012, Filed Date: Mar. 4, 2009, 10 Pages.

"Second Office Action Issued in Chinese Patent Application No. 200980112892.1", Mailed Date: Jul. 23, 2013, Filed Date: Mar. 4, 2009, 6 Pages.

* cited by examiner

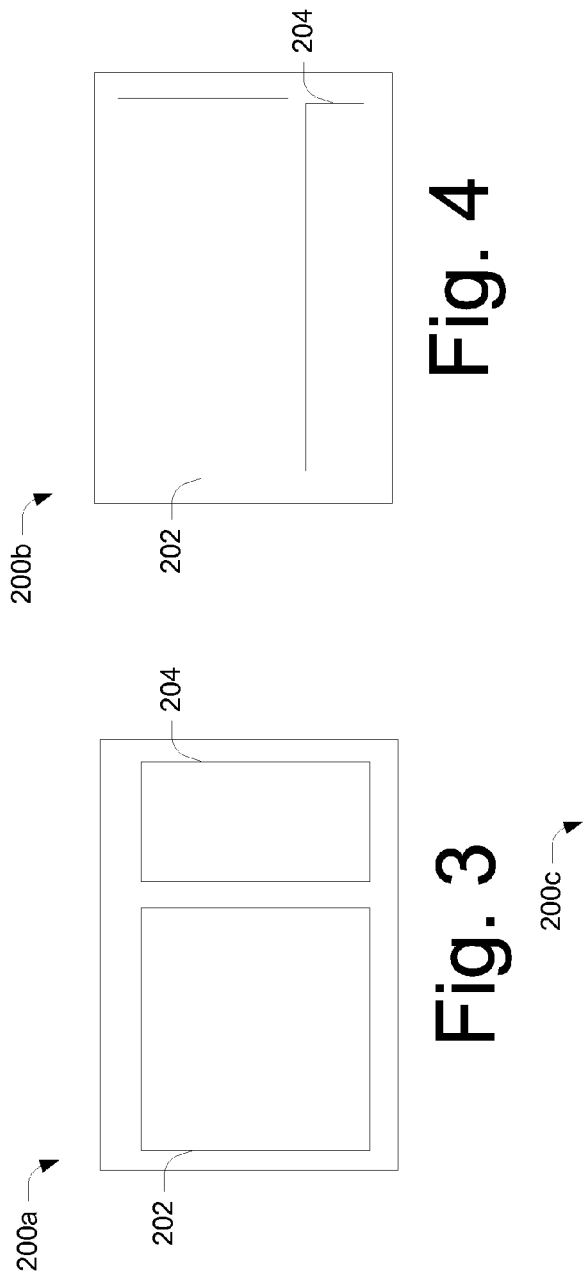

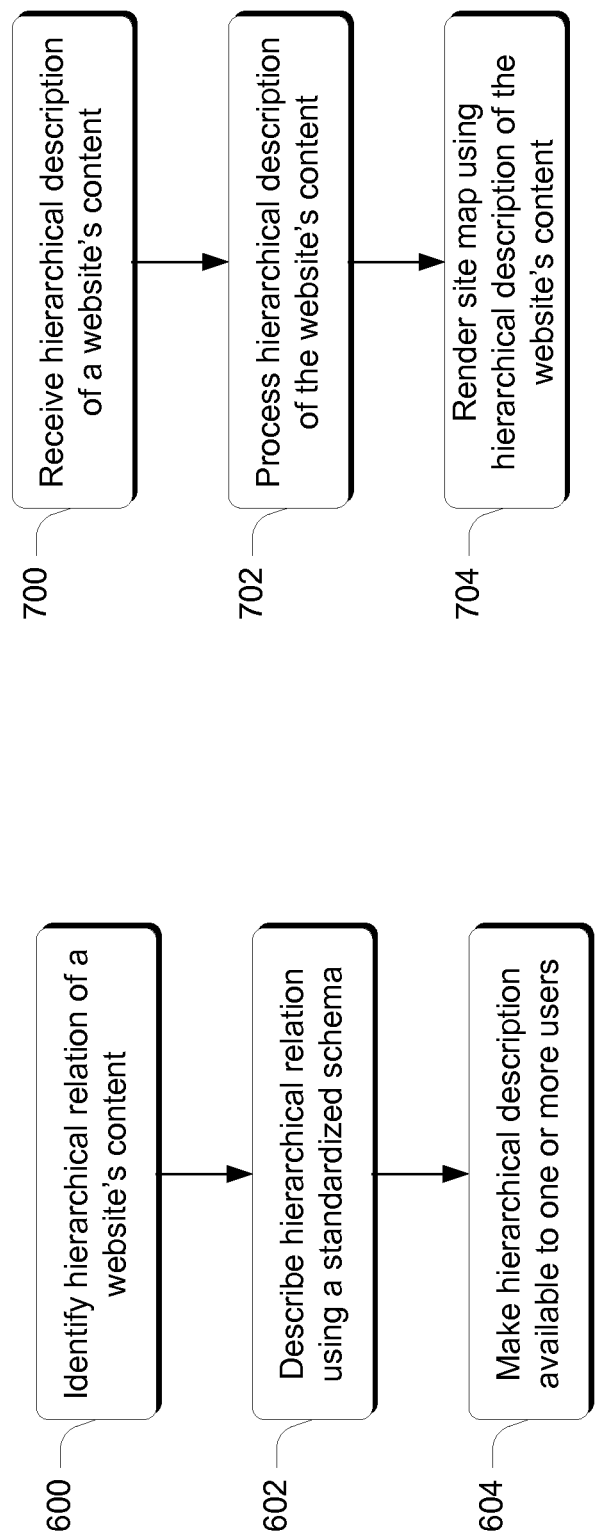

STANDARD SCHEMA AND USER INTERFACE FOR WEBSITE MAPS

PRIORITY

This application is a continuation and claims priority to U.S. patent application Ser. No. 12/098,397 entitled "Standard Schema and User Interface for Website Maps" and filed Apr. 4, 2008, the disclosure of which is incorporated by the reference herein in its entirety.

BACKGROUND

One of the first tasks a user faces when they visit a new Web site is that they have to try and acclimate themselves with what is available in terms of content and how to navigate around to the various content. Many sites handle this type of navigation in different ways, e.g. by employing flash navigation, vertical navigation, horizontal navigation, top navigation, bottom navigation and the like. Thus, it can be difficult for a user to get his or her bearings particularly when faced with multiple disparate experiences across different Web sites.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a standardized schema that can be used by site developers to define a site map and its associated hierarchy. In at least some embodiments, a corresponding user interface can be created within an application such as, for example, a Web browser, to allow the user to specify locations at which they wish to see the site map.

BRIEF DESCRIPTION OF THE DRAWINGS

The same numbers are used throughout the drawings to reference like features.

FIGS. 3-5 illustrate example user interfaces in accordance with one or more embodiments.

FIG. 6 is a flow diagram that describes steps in a method in accordance with one or more embodiments.

FIG. 7 is a flow diagram that describes steps in a method in accordance with one or more embodiments.

DETAILED DESCRIPTION

Overview

Various embodiments provide a standardized schema that can be used by site developers to define a site map and its associated hierarchy. In at least some embodiments, a corresponding user interface can be created within an application such as, for example, a Web browser, to allow the user to specify locations at which they wish to see the site map.

The various embodiments thus provide a more predictable and useable experience when a user explores new and different Web sites with which they are unfamiliar.

In the discussion that follows, a section entitled "Operating Environment" describes but one operating environment that can be utilized to practice the inventive principles described herein in accordance with one or more embodiments. Following this, a section entitled "Example User Interface" is provided and describes an example user interface in accordance with one or more embodiments. Next, a section entitled "Defining a Site's Site Map Using a Standardized Schema" describes how a site's site map can be defined using a standardized schema. Following this, a section entitled "Displaying a Site's Site Map Using a Standardized Schema" describes how a site's site map can be displayed using a standardized schema. Next, a section entitled "Example Standardized Schema" describes an example standardized schema in accordance with one or more embodiments. Following this, a section entitled "Extensions" describes various extensions that can be provided. Next, a section entitled "Example System" describes an example system that can be utilized to implement one or more embodiments.

Operating Environment

Figure 1:
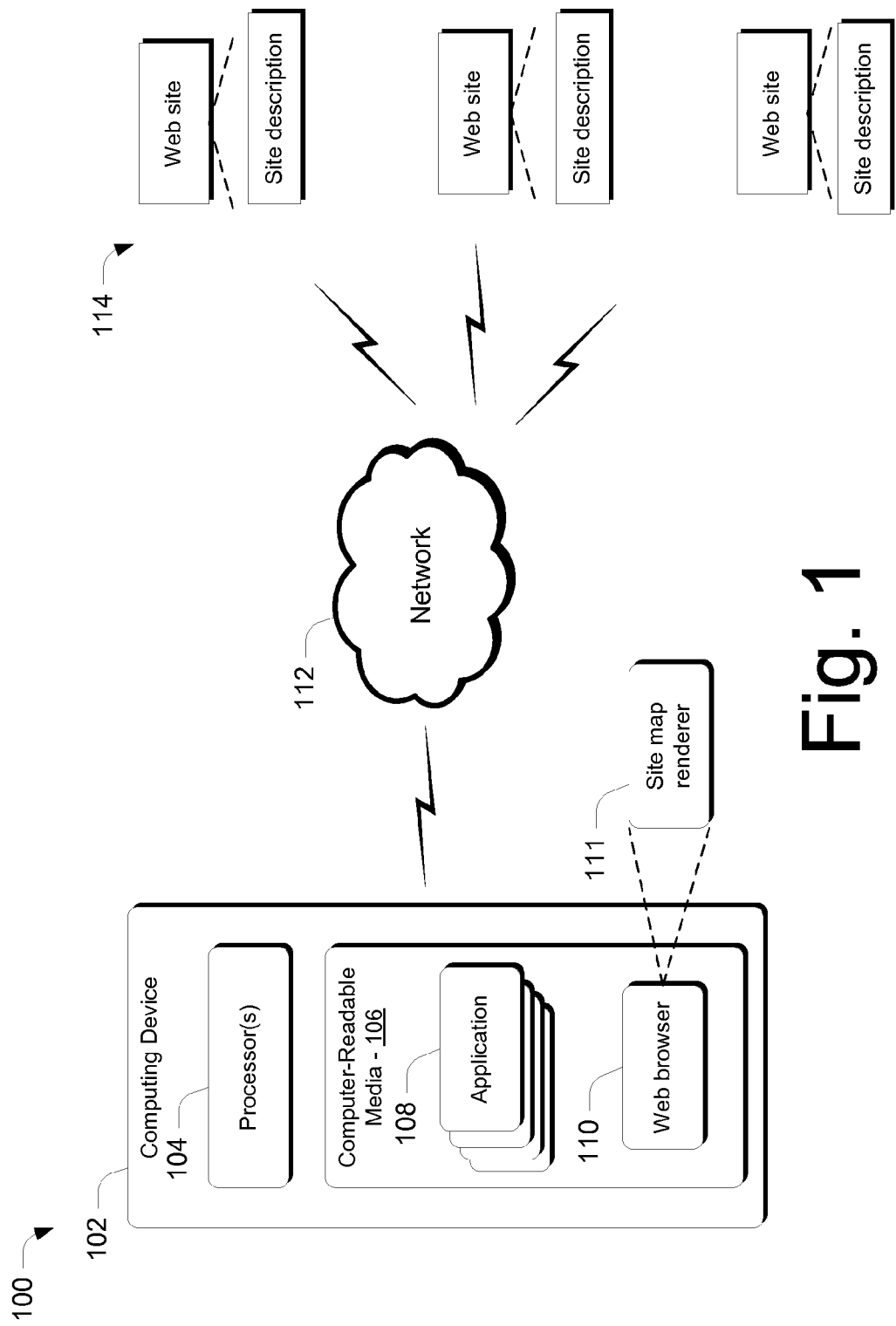
FIG. 1 illustrates an operating environment in accordance with one or more embodiments.

FIG. 1 illustrates an operating environment in accordance with one or more embodiments, generally at 100. Operating environment 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. In addition, computing device 102 includes an application in the form of a Web browser 110. Any suitably configured Web browser can be utilized, examples of which are commercially available from the assignee of this document and others.

In one or more embodiments, the Web browser includes or otherwise makes use of a site map renderer 111 which functions as described above and below. The site map renderer can comprise a native part of the browser, a plug-in which is subsequently added to the browser, and/or a standalone component that is used or otherwise leveraged by the browser. In addition, environment 100 includes a network 112, such as the Internet, and one or more Web sites 114 from and to which content can be received and sent.

In operation, a Web site can include a site map. The site map describes a Web site's content and its relation to other content on the Web site. In one or more embodiments, a standardized schema can be used by site developers to define their site map by way of a site description, and the site map's associated content hierarchy. In at least some embodiments, a corresponding user interface can be created within an application such as, for example, a Web browser, to, among other things, allow the user to specify locations at which they wish to see the site map.

Computing device 102 can be embodied as any suitable computing device such as, by way of example and not limitation, a desktop computer, a portable computer, a handheld computer such as a personal digital assistant (PDA), cell phone, and the like. One example of a computing device is shown and described below in relation to FIG. 9.

Having discussed the general notion of an example operating environment in which various embodiments can operate, consider now a discussion of an example user interface and an example standardized schema in accordance with one or more embodiments.

Example User Interface

Figure 2:
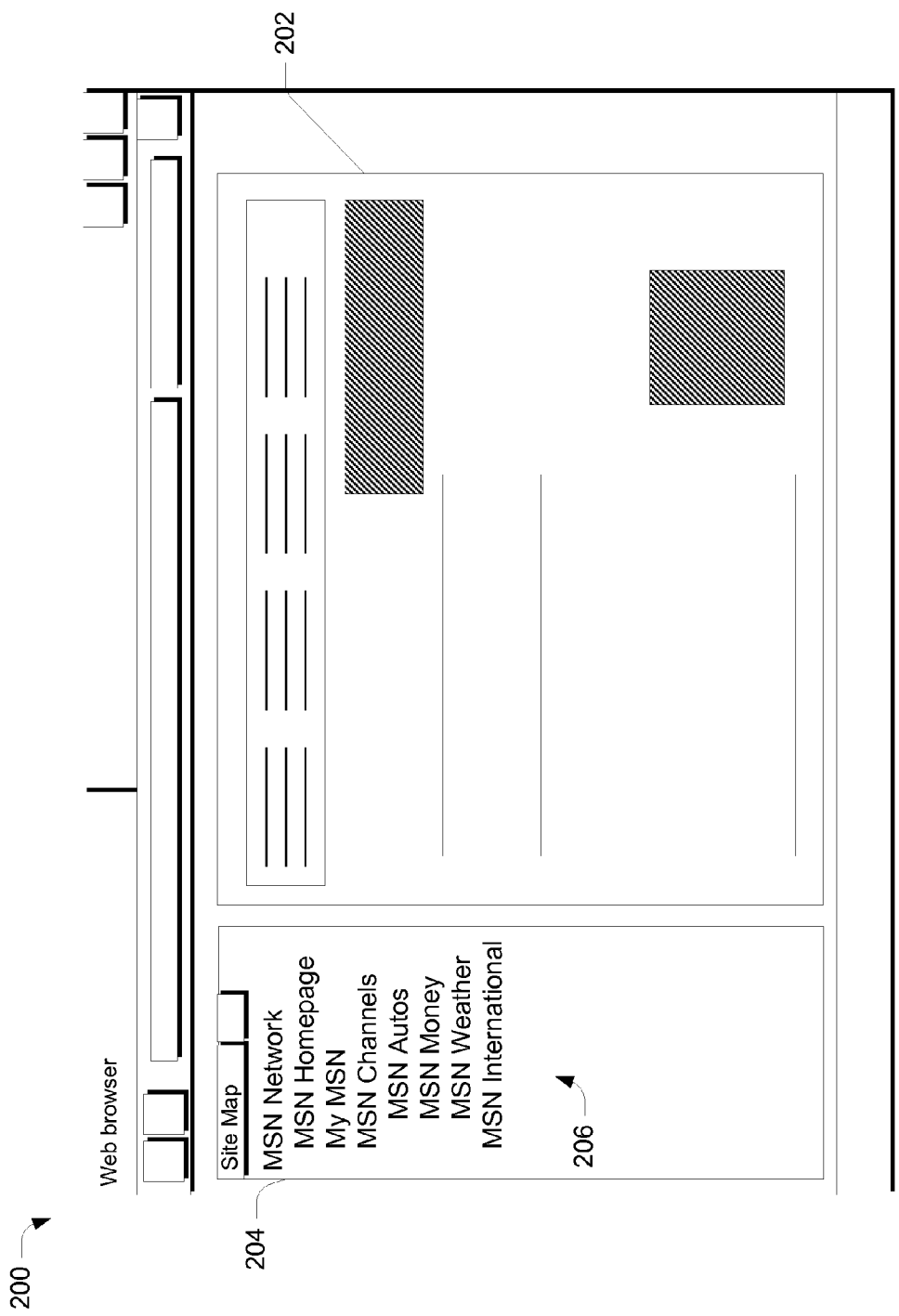
FIG. 2 illustrates an example user interface in accordance with one or more embodiments.

FIG. 2 illustrates an example user interface in accordance with one or more embodiments, generally at 200. In this particular example, user interface 200 is provided by a Web browser and includes content that has been rendered for a user. In this specific example, a portion 202 of the user interface is provided to render Web content, such as a Web Page, that is received from a Web server or Web content provider. In one or more embodiments, a portion 204 of the user interface is provided and is used to provide a site map for the user. In this example, the site map provides a hierarchically-structured association 206 of Web content associated with content displayed in portion 202.

In one or more embodiments, association 206 is generated based upon a file that contains a structured description of a site's content which complies with or otherwise follows a standardized schema that allows a site's developer to describe the site's content in a consistent, logical and structured manner. In at least some embodiments, the file is provided to a client side application, such as a Web browser, and is rendered by the client side application. Any suitable manner of providing a structured description of a site's content can be utilized. In at least some embodiments, the site's description is provided in an XML file that is provided to the client side application.

In the illustrated and described embodiment, a Web site can and often does have what are referred to as "departments". In addition, at least some departments can have so-called "sub-departments". Accordingly, in the present example, a department called "MSN Network" includes sub-departments comprising "MSN Homepage", "My MSN", "MSN Channels" and "MSN International". In addition, the sub-department "MSN Channels" includes sub-departments comprising "MSN Autos", "MSN Money", and "MSN Weather". Additionally, in at least some embodiments, the standardized schema can be utilized to enable a site developer to define which sub-departments are to be displayed and which sub-departments are to be hidden in an expandable fashion. For example, as will become apparent below, the sub-department "MSN International" can have additional sub-departments which are, in a default view, hidden from the user but which are otherwise expandable.

In at least some embodiments, association 206 can be rendered automatically for a user when a user navigates to a particular site. This enables the user to be exposed to a site's site map without having to otherwise navigate on a particular page to find the site map. In this manner, the user can be exposed to association 206 without having to click on a particular page associated with the site map. In addition, in at least some embodiments, association 206 can be displayed from multiple different pages associated with a particular Web site. So, for example, when a user initially navigates to a Web page, association 206 can be automatically displayed. Upon further navigation deeper into a particular Web page, the association 206 can continue to be displayed for the user. Further, in at least some embodiments, portion 204 is collapsible to hide the association for users who might be familiar with the particular site or otherwise do not wish to view the association.

In one or more embodiments, the user is provided with functionality that enables them to define where, in their user interface, portion 204 containing association 206 is displayed. As an example, consider FIGS. 3-5.

Specifically, FIG. 3 illustrates a user interface 200a in which a user has opted to display portion 204 on the right side of their user interface. Accordingly, in this example, portion 202 is displayed on the left side of the user interface. Similarly, in FIG. 4, the user has opted to display portion 204 at the bottom of their user interface. Accordingly, in this example, portion 202 is displayed at the top of user interface 200b. In FIG. 5, the user has opted to display portion 204 at the top of user interface 200c. Accordingly, in this example, portion 202 is displayed at the bottom of user interface 200c.

It is to be appreciated and understood that the different display options described just above are provided as examples only. Accordingly, the user can opt to display portion 204 in any suitable location without departing from the spirit and scope of the claimed subject matter.

Defining a Site's Site Map Using a Standardized Schema

FIG. 6 is a flow diagram that describes steps in a method in accordance with one or more embodiments. The method can be implemented in connection with any suitable hardware, software, firmware, or combination thereof. In at least some embodiments, the method can be implemented by software that is executable by a Web site developer.

Step 600 identifies hierarchical relations of a Web site's content. This step can be performed in any suitable way. In at least some embodiments, this step can be performed by identifying various departments and sub-departments associated with a Web site's content. It is to be appreciated and understood that a hierarchical relation can be defined by a collection of individual nodes associated with a Web site that themselves do not have any children nodes other than a common parent node that itself may have multiple children nodes.

Step 602 describes the hierarchical relation using a standardized schema. Any suitable standardized schema can be used, an example of which is provided below. In at least some embodiments, the standardized schema can be expressed in XML as will become apparent below. In these embodiments, using XML to express the standardized schema enables the schema to be extensible as will be appreciated by the skilled artisan.

Step 604 makes the hierarchical description available to one or more users. This step can be performed in any suitable way. For example, in at least some embodiments, the hierarchical description can be embodied in a file which is provided as part of a Web site or Web page when a user performs a navigation. In at least some embodiments, as noted above, the file can comprise an XML file. It is to be appreciated and understood, however, that other formats can be used to express the standardized schema without departing from the spirit and scope of the claimed subject matter.

Displaying a Site's Site Map Using a Standardized Schema

FIG. 7 is a flow diagram that describes steps in a method in accordance with one or more embodiments. The method can be implemented in connection with any suitable hardware, software, firmware, or combination thereof. In at least some embodiments, the method can be implemented by software that is executable by a client side device. For example, in at least some embodiments, the method can be implemented by a suitably-configured site map renderer such as that described above in FIG. 1 at 111.

Step 700 receives a hierarchical description of a Web site's content. The step can be performed in any suitable way. For example, in at least some embodiments, this step can be performed responsive to a navigation performed by a user. In at least some embodiments, when a user performs a navigation, a client side application such as a Web browser receives a file that contains a hierarchical description of the Web site's content. As noted above, this file can but need not comprise an XML file. Step 702 processes the hierarchical description of the Web site's content. This step can be performed in any suitable way. For example, in at least some embodiments, a client side application can receive a suitably-configured file and parse through the file to identify and learn of the Web site's hierarchically-structured content. Steps 704 renders a site map using the hierarchical description of the Web site's content. But one example of what such a rendering would look like is provided above.

Having now discussed the notion of a hierarchical description and how that hierarchical description can be built and consumed, consider now an example of a standardized schema that can be utilized to provide a hierarchical description of a Web site's content.

Example Standardized Schema

As noted above, the standardized schema can be expressed in any suitable fashion. In the example just below, the standardized schema is expressed in XML which can reside in the form of a file that is provided to a client side application responsive to a user performing a navigation to a Web site.

Figure 8:
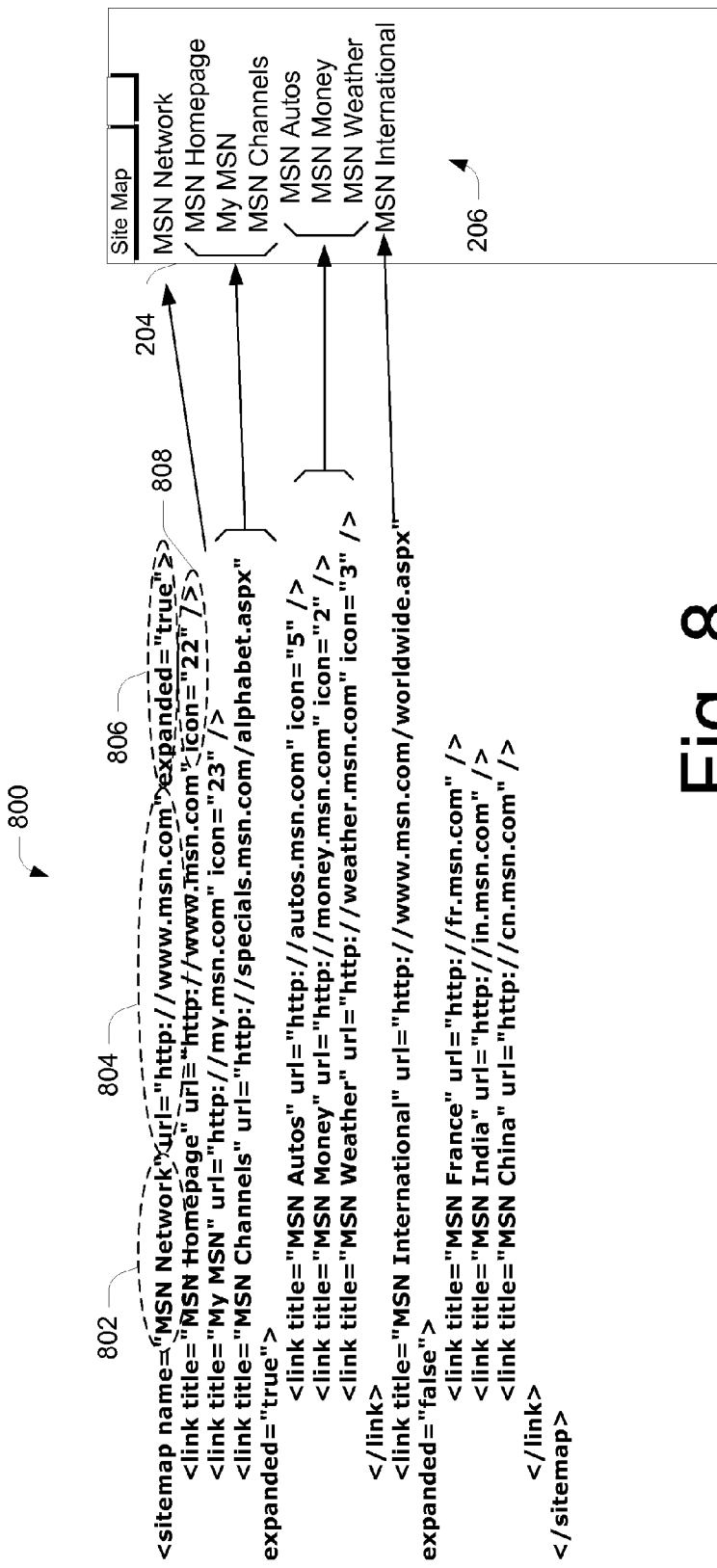
FIG. 8 illustrates an example representation that conforms to a standardized schema for describing a Website's content in accordance with one or more embodiments.

FIG. 8 illustrates an example representation generally at 800 that conforms to a standardized schema for describing a Web site's content in accordance with one or more embodiments. FIG. 8 also illustrates how this representation is mapped to association 206 comprising part of the display of user interface portion 204.

In the illustrated and described embodiment, the standardized schema includes a number of elements individual ones of which are related to individual departments or sub-departments of a Web site. The individual elements in this example include user-friendly names such as that shown at 802. In addition, at least some of the elements include a URL that is associated with a particular page. An example of such a URL is shown at 804. Further, in at least some embodiments, individual elements can have a property that defines whether the element is to be rendered in an expanded or unexpanded manner. For example, such a property is shown at 806 which shows the property "expanded" which is set as "true". In this case, when such a property is set to "true", individual sub-departments underneath a particular department are automatically rendered for the user. This particular property enables site developers to define a default view for their site map that they believe will best suit the user.

Further, in at least some embodiments, individual elements of the schema can have a property associated with an icon that is to be displayed when the site map is rendered. An example of this is shown at 808 in which the "icon" property is set to "22" which identifies a particular icon that is to be rendered when the site map is rendered. This feature can enable site developers to provide unique and/or branded icons that are to be displayed in a rendered site map.

In this example, notice how the individual portions of the schema representation are mapped to portion 204. Specifically, department "MSN Network" maps to a display of the name "MSN Network" in portion 204. Notice also that this particular element's "expanded" property is set as "true". Accordingly, the children of this element are displayed in portion 204 as a default view. Similarly, the "expanded" property for "MSN Channels" is set to "true". Accordingly, for this element, its children are displayed in the default view as shown. Notice also that the element "MSN International" has its "expanded" property set to "false". Accordingly, the children of this element which appear in the schema representation are not rendered automatically in the default view. Rather, functionality within portion 204 can be provided that allows a user to expand this particular element to view its children.

Extensions

In one or more embodiments, different extensions to the above-described concept are possible. For example, often times a user will have set, as part of their preferences, a particular language. This preference setting defines a language in which a user would prefer to see Web content rendered. In at least some embodiments, if a user has a particular language preference set as part of a client application or, more generally, their system, the standardized schema can be used to render a site map in a particular language that corresponds to the user's preferred language. For example, different language representations of a site's content can be described in the standardized schema. If a user has a language preference set, then a corresponding language in the standardized schema can be selected for rendering the site map.

In at least some other embodiments, different site maps can be served to different people depending on information that has been ascertained about the people. For example, if a particular network has information about the preferences or profiles of a particular user, this information can be used to provide a site map that is tailored to the user's profile. For example, if a particular user is a sports fan and information maintained at the server indicates such to be the case, a site map can be selected that is more specifically tailored to the sports fan.

In one or more other embodiments, the standardized schema can include a tag or tags with associated properties that indicate which pages are appropriate for different types of devices. For example, a property might indicate that a particular page is suitable for display on a mobile, hand-held device. In this case, the client device can make an informed decision on how to render particular content.

Example System

Figure 9:
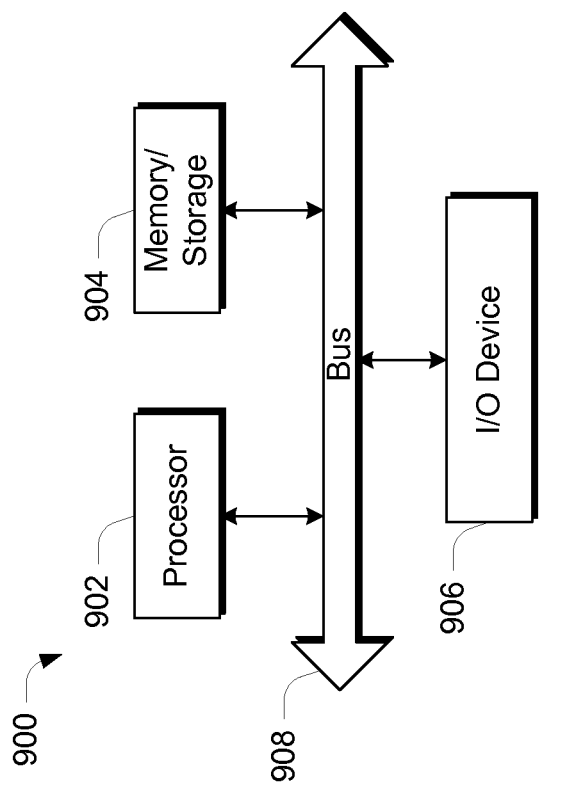
FIG. 9 illustrates an example system in accordance with one or more embodiments.

FIG. 9 illustrates an example computing device 900 that can implement the various embodiments described above. Computing device 900 can be, for example, computing device 102 of FIG. 1 or any other suitable computing device.

Computing device 900 includes one or more processors or processing units 902, one or more memory and/or storage components 904, one or more input/output (I/O) devices 906, and a bus 908 that allows the various components and devices to communicate with one another. Bus 908 represents one or more of any of several types of bus structures, including a memory bus or memory controller, a peripheral bus, an accelerated graphics port, and a processor or local bus using any of a variety of bus architectures. Bus 908 can include wired and/or wireless buses.

Memory/storage component 904 represents one or more computer storage media. Component 904 can include volatile media (such as random access memory (RAM)) and/or non-volatile media (such as read only memory (ROM), Flash memory, optical disks, magnetic disks, and so forth). Component 904 can include fixed media (e.g., RAM, ROM, a fixed hard drive, etc.) as well as removable media (e.g., a Flash memory drive, a removable hard drive, an optical disk, and so forth).

One or more input/output devices 906 allow a user to enter commands and information to computing device 900, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide a standardized schema that can be used by site developers to define a site map and its associated hierarchy. In at least some embodiments, a corresponding user interface can be created within an application such as, for example, a Web browser, to allow the user to specify locations at which they wish to see the site map.

The various embodiments thus provide a more predictable and useable experience when a user explores new and different Web sites with which they are unfamiliar.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. One or more computer-readable storage media embodying computer-readable instructions which, when executed, implement a method comprising:
   receiving a hierarchical description of a website's content embodied in a file which is provided as part of multiple different web pages associated with the website received responsive to navigation to any one of the multiple different web pages;
   processing the hierarchical description of the website's content effective to render a site map using the hierarchical description of the website's content, wherein rendering takes place automatically when a navigation occurs to any one of the multiple different web pages without requiring a user to take any action other than navigating to any one of the multiple different web pages to cause a visual rendering of the site map to appear.

2. The one or more computer-readable storage media of claim 1, wherein a standardized schema describes a consistent and structured schema applicable to multiple websites.

3. The one or more computer-readable storage media of claim 1, wherein the file is received by a client-side application.

4. The one or more computer-readable storage media of claim 1, wherein the file is an XML file that is received by a web browser.

5. The one or more computer-readable storage media of claim 1, wherein the standardized schema includes a number of elements individual ones of which are related to individual departments or sub-departments of a website.

6. The one or more computer-readable storage media of claim 5, wherein at least some individual elements include names to be displayed.

7. The one or more computer-readable storage media of claim 5, wherein at least some individual elements include a URL that is associated with a particular page.

8. The one or more computer-readable storage media of claim 5, wherein at least some individual elements have a property that defines whether the element is to be rendered in an expanded or unexpanded manner.

9. The one or more computer-readable storage media of claim 5, wherein at least some individual elements have a property associated with an icon that is to be displayed when a site map is rendered.

10. A system comprising:
    one or more computer readable storage media;
    computer readable instructions on the one or more computer readable storage media which, when executed, implement a method comprising:
    receiving, by a client side application, a hierarchical description of a website's content using a standardized schema embodied in an XML file, the file provided as part of multiple different web pages associated with the website received responsive to navigation to any one of the multiple different web pages, the standardized schema describing a consistent and structured schema applicable to multiple websites;
    processing the hierarchical description of the website's content effective to render a site map using the hierarchical description of the website's content, wherein rendering takes place automatically when a navigation occurs to any one of the multiple different web pages without requiring a user to take any action other than navigating to any one of the multiple different web pages to cause a visual rendering of the site map to appear.

11. The system of claim 10, wherein the standardized schema includes a number of elements individual ones of which are related to individual departments or sub-departments of a website.

12. The system of claim 11, wherein at least some individual elements include names to be displayed and a URL that is associated with a particular page.

13. The system of claim 11, wherein at least some individual elements have a property that defines whether the element is to be rendered in an expanded or unexpanded manner.

14. The system of claim 11, wherein at least some individual elements have a property associated with an icon that is to be displayed when a site map is rendered.

15. A method comprising:
    receiving, by a client side application of a computing device, a hierarchical description of a website's content using a standardized schema embodied in a file which is provided as part of multiple different web pages associated with the website received responsive to navigation to any one of the multiple different web pages, the standardized schema describing a consistent and structured schema applicable to multiple websites;
    processing, by the computing device, the hierarchical description of the website's content effective to render, by a site map renderer of the client side application of the computing device, a site map using the hierarchical description of the website's content, wherein rendering takes place automatically when a navigation occurs to any one of the multiple different web pages without requiring a user to take any action other than navigating to any one of the multiple different web pages to cause a visual rendering of the site map to appear.

16. The method of claim 15, wherein the file is an XML file that is received by a web browser.

17. The method of claim 15, wherein the standardized schema includes a number of elements individual ones of which are related to individual departments or sub-departments of a web site.

18. The method of claim 17, wherein at least some individual elements include names to be displayed and a URL that is associated with a particular page.

19. The method of claim 17, wherein at least some individual elements have a property that defines whether the element is to be rendered in an expanded or unexpanded manner.

20. The method of claim 17, wherein at least some individual elements have a property associated with an icon that is to be displayed when a site map is rendered.

\* \* \* \* \*